United States Patent [19]

Hale et al.

[11] Patent Number: 4,526,377
[45] Date of Patent: Jul. 2, 1985

[54] TURN-OVER SEAL

[75] Inventors: Richard A. Hale, Downers Grove; Nils O. Olsson, Glen Ellyn; Thomas F. Reiff, Bridgeview, all of Ill.

[73] Assignee: J. I. Case Company, Racine, Wis.

[21] Appl. No.: 529,298

[22] Filed: Sep. 6, 1983

[51] Int. Cl.³ .............................................. F16J 15/56
[52] U.S. Cl. .......................................... 277/9; 277/25; 277/152
[58] Field of Search .......... 277/9, 9.5, 92, 25, 277/1, 81 R, 152

[56] References Cited

U.S. PATENT DOCUMENTS

| 2,232,325 | 2/1941 | Hamilton | 277/9 |
| 3,627,390 | 12/1971 | Irwin | 277/25 |
| 3,848,878 | 11/1974 | Mayer | 277/25 |
| 4,114,897 | 9/1978 | Bainard | 277/152 |
| 4,126,316 | 11/1978 | Cather | 277/9 |

Primary Examiner—Robert I. Smith
Attorney, Agent, or Firm—Dressler, Goldsmith, Shore, Sutker & Milnamow, Ltd.

[57] ABSTRACT

A ring seal for protecting a designated area from ambient contamination is alternately placeable into its sealing and non-sealing positions. The ring seal permits a limited travel between the sealable surfaces without compromising the seal integrity. The ring seal facilitates an interference-free installation and selective maintenance of the sealable parts.

8 Claims, 1 Drawing Figure

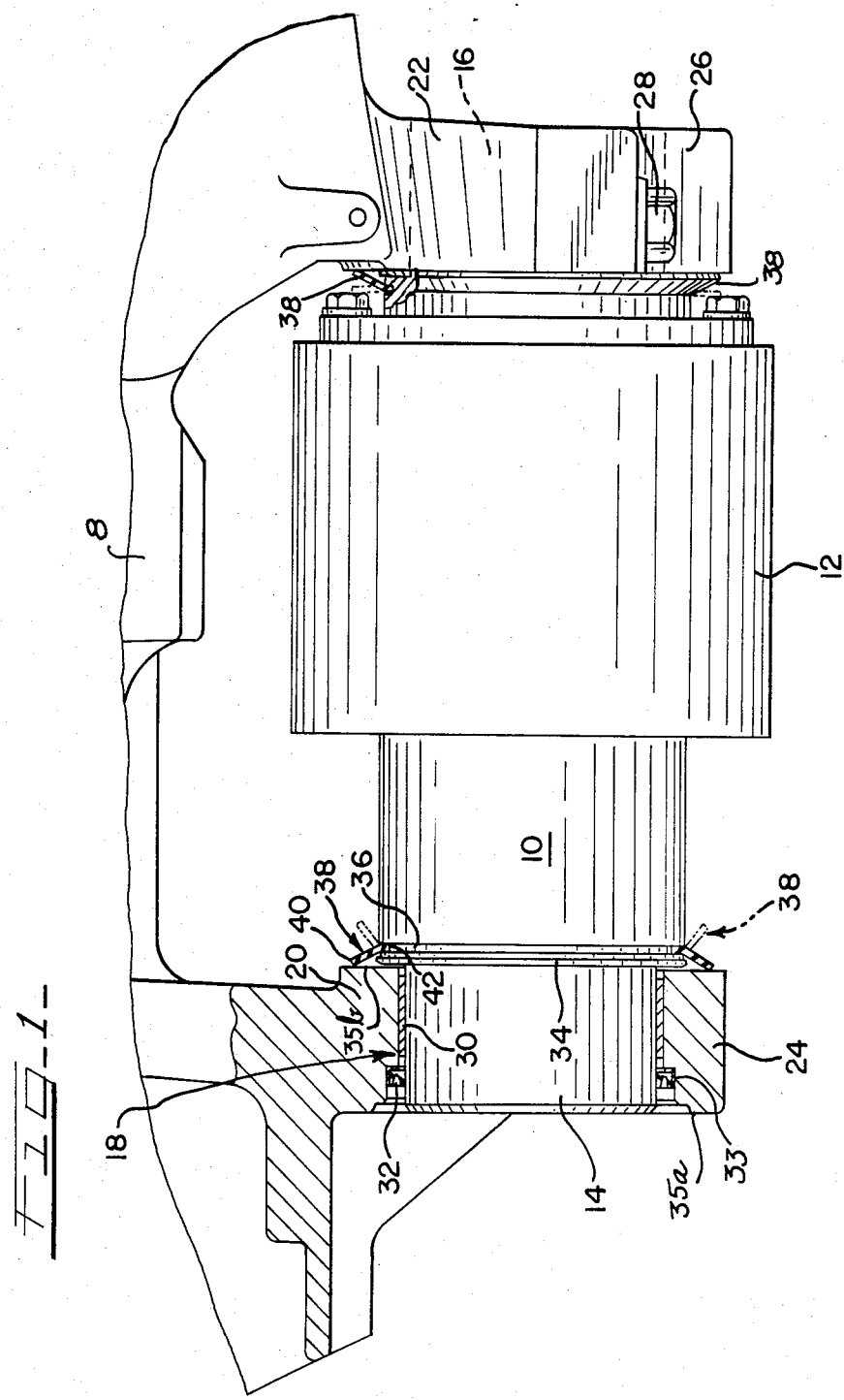

TURN-OVER SEAL

BACKGROUND OF THE INVENTION

1. Field of the Invention

This invention pertains to grease seals and more particularly to an elastomeric ring seal facilitating an interference-free installation and maintenance of the parts and areas subject to sealing.

2. Information Disclosure Statement

The subject invention pertains to a seal which can be placed in its sealing position at will. This is particularly important for the sealable parts which must be assembled and thereafter maintained without interference of permanently embedded seals.

A below described embodiment exemplifies an application of the seal to a tracctor axle, which must be attached to an axle support called a bolster. The axle is restrained from moving fore-and-aft by means of thrust washers at both the front and rear of the bolster. The axle pivot bushings and thrust surfaces are lubricated by means of periodic greasing. The life of these elements is greatly increased if contamination by environmental pollution such as dust and moisture can be kept out. Conventional lip seals used at the thrust surfaces cannot be employed, because they interfere with an axle installation and enable keeping both thrust surfaces on the bolster and on thrust washers sealed. The novel seal is intended to keep dust and moisture out and grease in. Also the subject seal is of purgeable design which allows grease to flush out under the seal during the greasing operation, thereby flushing out any contamination that may have entered into pivot bushing or thrust surfaces.

SUMMARY OF THE INVENTION

According to the present invention, a ring seal for protecting a designated area from ambient contamination is alternately placeable in first and second positions. The ring seal is mounted in the vicinity of the designated area and bares this area in the first position and covers it in the second position. The retaining means for keeping said seal in either position are disposed near the designated area.

BRIEF DESCRIPTION OF THE DRAWINGS

FIG. 1 is a partially cross-sectional side view of a ring seal assembly mounted on a vehicle axis.

DESCRIPTION OF THE PREFERRED EMBODIMENT

The invention may be carried into practice in a number of ways but one specific embodiment will be described by way of example only.

Referring now to FIG. 1, there is shown a vehicle bolster 8 supporting an axle 10, which can be a shaft or any other tubular member, having a differential 12. The axle 10 has its ends 14 and 16 journalled in two vehicle bolster bearings 18. The axle ends 14 and 16 have a similar diameter than the axle 10 so as to form a transition shoulder 17 at each axle end. The ends 14 and 16 are supported by the bolster half-bearings 20 and 22 coupled with the lower half-bearings or caps 24 and 26, respectively, by bolts 28. A steel bushing 30 separates the axle 10 from the bearing 18. A lip seal 32 mounted on the outer edge of the axle end 14 in a bearing annular rabbet 33 insulates the bearing 18 from the entry of dirt and moisture from the bearing outer side 35a. The thrust washer 34 abuts the shoulder 17, which is located close to the bearing inside surface 35b and limits the axle travel between the bearings 18 after the installation of the axle 10 into the bearings 18.

A peripheral circumferential groove 36 running in the axle 10 is disposed near each thrust washer 34. An elastomeric ring seal 38 shaped as a flat washer has a free-standing outer edge 40 and an inner edge 42 inserted into the groove 36. The outer edge 40 of the ring seal 38 is forced to contract by virtue of the rubber-like material compressing the ring toward the axle 10, thus giving the seal a concave or bottomless dish configuration. Prior to the upward mounting of the shaft or axle 10 into the upper half-bearing 20 or 22, the ring seal 38 can be flipped over and away from the bearing 18. In this position the outer edge 40 of the seal 38 rests against the shoulder 17 or differential 12, or any other upright standing part, if any. It must be understood that the seal can operate even without such a supporting part. Both seals 38 are facing each other in this axle pre-assembly or maintenance position. After the axle installation is completed, i.e., the caps 24 and 26 are already attached to the upper half-bearings 20, 22 by bolts 28, the ring seals 38 can be flipped over toward the bearings 18 until the outer edge thereof rests against the inside surface 35b of the bearing 18. In this position the ring seal 38 covers the area of contact between the bearing 18 and the axle 10, as well as between the thrust surface of the washer 34 and bearing inside surface 35b, thereby protecting them from an undesirable environmental contamination and entry of any foreign matter into the grease-full space between the axle 10 and the bearing 18.

The afore-described novel ring seal, which is simply a flat washer-shaped piece of elastomeric material, provides a number of important advantages, such as a facile mounting and dismounting from the shaft, extremely low cost of manufacturing, repair and replacement, an assembly time reduction, etc. One of the most important features of the invention is the ability of providing an interference-free installation of the shaft into the bearing means, which would be impossible to achieve with a conventional lip seal design.

The novel seal mounts into an axle groove and flips out of the way for an installation or maintenance of the axle into the bolster bearing. When the axle is placed into bolster boster bearing and after lower half-bearing caps are attached to the upper bolster bearing, the seal is flipped into its normal running position.

The seal allows the grease to be flushed out from under the seal during the greasing operation. The seal's ability to restore its original sealing position permits a flush-out of any contamination that may have entered into the bushings or thrust surfaces. Also, this permits to do away with precise manufacturing tolerances and allows a certain longitudinal axial travel of the axle in the bearing without compromising the integrity of the seal. No tools or other parts are needed for the seal alternate positioning, because it is biased to seal the designated area of protection by virtue of the elastomeric quality of the material itself.

While one embodiment of the invention has been illustrated as described herein, various changes and modifications may be made therein without departing from the spirit of the invention as defined by the scope of the appended claims.

What is claimed is:

1. A ring seal for protecting a designated area from ambient contamination and pivotable between first and second positions at will;
   said ring seal comprising a lower portion and upper portions;
   said lower portion being removably embedded in a tubular member adjacent and designated area;
   said upper portion being freestanding and freely moveable from side-to-side between said positions;
   said ring seal baring said designated area in said first position and sealing said area in said second position; and
   retaining means for keeping said seal in said positions located near said designated area.

2. The invention according to claim 1, and
   said retaining means comprising a groove peripherally encircling said tubular member and said ring seal being inserted into and held by said groove.

3. The invention according to claim 1, and
   said ring seal comprising an elastomeric flat annulus having a concave configuration in either of said positions and respectively pointed in opposite directions.

4. The invention according to claim 1, and
   said tubular member being attached to a stationary support structure while said ring seal being placed in said first position and thereafter flippable over into said second position regardless of said member rotational characteristics;
   said ring seal contiguous with said support structure in said second position and permitting a limited axial travel of said tubular member relative to said support structure without compromising its sealing characteristics.

5. A ring seal for protecting a designated area from ambient contamination and alternately placeable in first and second positions;
   said ring seal being mounted in the vicinity of said designated area;
   said ring seal baring said designated area in said first position and covering said area in said second position;
   retaining means for releasably keeping said seal in said positions located near said designated area;
   said retaining means holding one edge of said ring seal and permitting another edge thereof to move into said positions;
   said retaining means comprising a groove peripherally encircling a tubular member and said ring seal being inserted into and held by said groove;
   said ring seal extending essentially transversely to said tubular member;
   said ring seal comprising an elastomeric flat annulus having a concave configuration in said first and second positions due to elastomeric material contracting characteristics of said seal.

6. The invention according to claim 5, and said seal being biased toward said tubular member in said first and second positions;
   said seal being able to resume its original position after its displacement by a force of fluid passing through said designated area.

7. A ring seal assembly for protecting a designated area from environmental contamination and comprising:
   a first ring seal mounted at one end of a tubular member near a support bearing means;
   said first ring seal comprising a resilient flat annulus detachably placed in its first position prior to an installation of said tubular member into said bearing means;
   said first seal having a free end portion thereof being turned away from said bearing means in said first position to facilitate said installation;
   said free end portion being turned over into its second position wherein said seal prevents an entry of a foreign matter and environmental pollution into said bearing means;
   second ring seal mounted at another end of said tubular member near another bearing means;
   said first and second seals facing each other prior to said installation of said member into each of said bearing means and their free end portions being turned over toward corresponding bearing means for sealing thereof after said installation.

8. The invention according to claim 7,
   wherein said seal comprises a flat elastomeric annulus having a dish-like configuration and is retained in a peripheral groove in said tubular member;
   said seal permitting a limited travel of sealable surfaces relative to each other without violating said seal integrity.

* * * * *